METHOD OF MAKING A MAGNETIC RECORDING MEMBER

Filed June 23, 1969

INVENTOR
SIDNEY TIES
BY Hane and Baxley
ATTORNEYS

United States Patent Office 3,671,351
Patented June 20, 1972

3,671,351
METHOD OF MAKING A MAGNETIC RECORDING MEMBER

Sidney Ties, Stevenage, England, assignor to International Computers Limited, London, England Filed June 23, 1969, Ser. No. 835,575
Claims priority, application Great Britain, July 9, 1968, 32,713/68
Int. Cl. B44c *1/06*
U.S. Cl. 156—233 4 Claims

ABSTRACT OF THE DISCLOSURE

A method for producing a magnetic recording member having a film of magnetic material with a highly finished surface on a backing layer is disclosed. The method includes the steps of preparing a glass disc such that the disc surface is of near optical flatness, depositing a film of magnetic material on the disc, bonding a backing layer to the film and stripping the glass disc from the film to reveal a highly finished surface on the film of magnetic material, the film being bonded to the backing layer. A two-sided magnetic recording member may be produced by placing two three-layer structures back to back and stripping both glass discs to reveal two highly finished magnetic films.

BACKGROUND OF THE INVENTION

The present invention relates to a method of making a magnetic recording member.

It has previously been proposed to use members having a planar magnetic recording surface in conjunction with information storage apparatus. The members, which are usually in the form of discs having a high-coercivity surface, are mounted so that the recording surface is moved relative to magnetic recording and/or reading heads and information is stored on the members in the form of discrete changes of magnetic state.

The previously known discs have usually been fabricated from, for example, a sheet of aluminium which has been highly polished, and a film of, for example, cobalt has been deposited on the polished surface, the exposed face of the film then being lapped to provide a high quality surface finish. The required high quality finish has necessitated a careful and costly mechanical operation to be performed on the coated discs, and the initial steps of preparing the disc to receive the film coating have also required to be carefully performed, and hence are expensive to carry out.

Also, it is known to form a magnetic layer on a base member by electrolessly depositing a suitable coating, such as a nickel-phosphorous coating and heating the coated base member in an annealing furnace. Such heating is necessary to change the coating from an amorphous to microcrystalline state and thereby imparts magnetic properties to the coating. While it is not necessary to machine such as coating, the temperature and conditions within the annealing furnace must be carefully controlled. Of even more importance is the fact that such an annealed coating must be critically cooled such that magnetic properties of the coating are not lost upon removal from the annealing furnace. Thus, a great deal of care and attention is necessary to produce a magnetic coating on a base member by such a process.

SUMMARY

The present invention therefore provides a simple and reliable method for producing a magnetic recording surface on a backing member, the recording surface being highly finished. Specifically, by stripping a glass disc having a surface of near optical flatness from a film of magnetic material the revealed film has a highly finished surface. Thus, such a surface may be produced without resorting to costly and laborious techniques for smoothing and lapping a film of magnetic material. The preferred embodiment of the invention includes a particularly effective technique for stripping the glass disc from the film of magnetic material. This technique employs a vacuum pressure above the disc which causes the disc to follow movement of a holding device, thereby stripping the disc from the film of magnetic material. This technique has the advantage of applying a uniform stress to the disc so that, as the disc is stripped from the film of magnetic material, the likelihood of the disc cracking or breaking is substantially reduced or avoided.

BRIEF DESCRIPTION OF THE DRAWING

One embodiment of the invention will now be described with reference to the accompanying drawing in which.

DESCRIPTION OF THE PREFERRED EMBODIMENT

Figure 1:
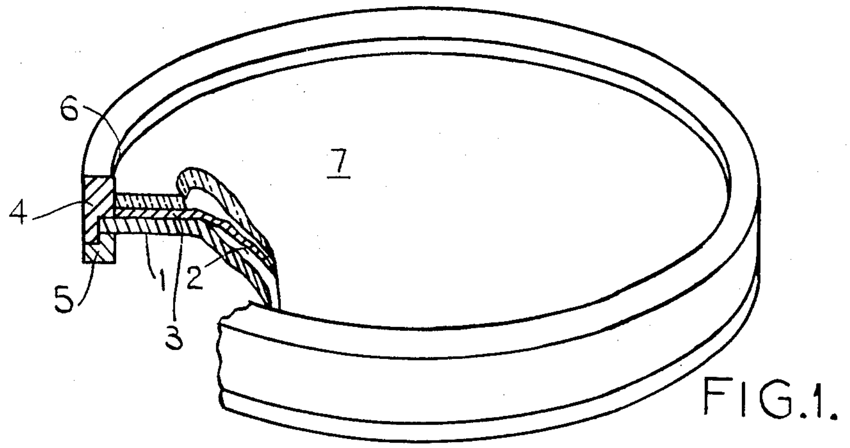
FIG. 1 shows, by a partially sectioned view, steps in the formation of a recording member.

Referring now to FIG. 1, a planar glass disc 1, having a highly finished surface 2, is coated with a magnetic film 3 of cobalt. It is to be understood that the dimensions indicated in the figure are not to scale, the thickness of the film 3 being exaggerated with respect to the thickness of the glass disc 1, for the sake of clarity. In order to produce a sufficiently high quality on the surface of the finished member, it is desirable that the surface 2 of the glass disc 1 on which the film 3 is deposited shall be of nearly optical flatness. It is believed, however, that glass of the quality termed "flowed sheet" provides an acceptable surface. However, if such glass is not available a normal glass surface may be prepared by conventional grinding or lapping techniques to produce a highly finished surface or near optical flatness. The coating of the glass disc 1 with the cobalt film 3 is performed by an electroless deposition process.

The coated disc 1 is placed in a recessed mould ring 4, with the coated surface 2 towards the interior of the mould ring 4, and is clamped in position by means of a retaining ring 5. The mould ring 4 then forms a retaining wall 6 surrounding the film 3 on the disc 1. A synthetic thermosetting resin is then applied to the exposed surface of the film 3 within the retaining wall 6 of the mould ring 4. The synthetic resin is preferably in the form of a viscous liquid and is allowed to flow over the surface of the film 3 to avoid the formation of air bubbles. The entire assembly, with the resin contained within the mould ring is subjected to heat to cure resin to form a thick layer 7 adhering to the film layer 3. When the resin layer is completely cured the assembly is allowed to cool, and is removed from the mould ring 4. At this point the cobalt film layer 3 remains strongly adhering to the resin layer 7. The cobalt film 3, however, does not adhere strongly to a glass surface of the quality possessed by the surface 2 of the glass disc 1. Hence, it is now possible to strip the glass disc 1 from the other two layers, leaving the cobalt film 3 firmly adhering to and supported by the resin layer 7, and the surface finish of the film 3 exposed by the removal of the glass disc 1 is determined by the glass surface 2, that is, it is flat and highly finished without further treatment. It is preferred, in the present case, however, to produce a double-sided recording member, and to this end the glass disc 1 is not at this stage stripped from the film 3. Instead a second assembly consisting of a glass disc 1', a cobalt film layer 3' and a resin layer 7' is produced in the manner previously described.

Figures 2, 3:
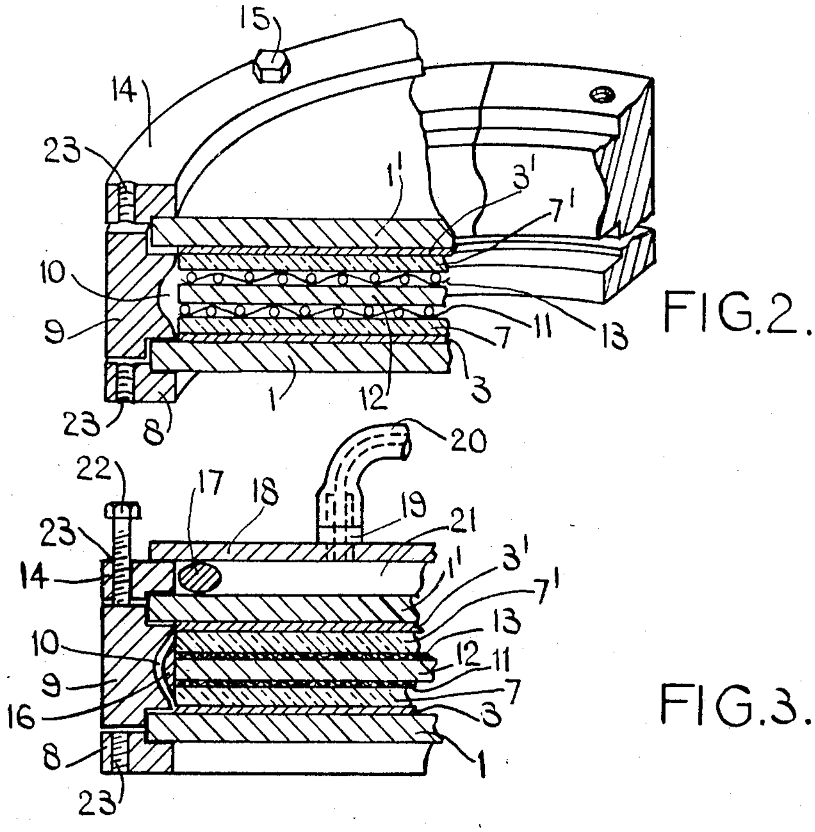
FIG. 2 shows, by means of a sectional partial view, further steps in the formation of a composite member.
FIG. 3 shows, by a sectional view yet further steps in the formation of the composite member.

The next following steps of the process are illustrated in FIG. 2. The first assembly of disc 1 and layers 3 and 7 is placed upon a recessed ring 8, the glass layer 1 fitting inside the recess of the ring 8, which extends outwardly around the disc 1, the recess being less deep than the thickness of the disc 1, so that part of the disc 1 and the layers 3 and 7 project above the upper surface of the ring 8. A diametrically split mould ring 9 is placed on the ring 8 to surround the assembly of layers 1, 3 and 7. The ring 9 is recessed at the bottom to fit around the glass disc 1 and extends inwards above the disc 1 to form a wall 10 about the film resin layers 3 and 7. The wall 10 is hollowed out to provide a space within the interior of the mould surrounding the layers 3 and 7. The ring 9 is maintained in position on the ring 8 by bolts (not shown) passing through holes in the ring 8 into threaded holes in the ring 9, the bolts being adjusted to clamp the upper surface of the edges of the glass disc 1 to the underside of the lower recess in the mould ring 9.

A layer 11 of reinforcing material, such as woven fibre glass matting, is laid over the upper surface of the resin layer 7. A core disc 12 of glass, for example, is next laid over the reinforcing material 11, and this is followed by a further layer 13 of the reinforcing material. During the application of these layers 11 and 13 and the core disc 12, synthetic resin (not shown), again preferably in the form of a viscous liquid, is applied to the interior of the mould ring 9, care being taken as the layers and disc are inserted to avoid trapping air between the layers.

The second assembly of glass disc 1', film layer 3' and resin layer 7' is now inverted and is laid over the upper reinforcing layer 13, the mould ring 9 being recessed above the interior wall 10 to permit the resin and film layers to enter the interior of the mould ring 9 to a predetermined depth. A further recessed retaining ring 14 is then placed over the edge of the glass disc 1', and the retaining ring 14 is forced downwards by bolts 15 passing through the ring 14 into threaded holes (not shown) in the mould ring 9. This downward movement of the ring 14 pushes the glass disc 1' into the recess in the top of the mould ring 9 to ensure that the completed assembly is of the correct predetermined overall thickness and in so doing presses the component layers into intimate contact, causing excess resin to exude from the layers into the space within the mould provided by the shape of the wall 10. As well as permitting the overfilling of the interior of the mould with resin to allow the firm bonding of the layers, this space also allows the excess resin to be formed over the edges of the layers to seal and bond them together. It will be realised that the quantity of resin applied during the assembly of the layers of the stack is preferably adjusted so that the resin exuded into the space within the wall 10 is sufficient to form the edge sealing band about the stack, and that for this reason it is desirable that the thickness of the resin layers 7 and 7' are maintained at a predetermined level. Hence the quantity of resin used in forming the layers 7 and 7' is also preferably carefully controlled. At the conclusion of this stage of the process, the entire assemblage is subjected to heat to cure the resin, and is then cooled once more.

It now remains to strip off the glass discs 1 and 1' from the composite recording member, and for the purpose of the following description, reference is made to FIG. 3, which shows, in section a partial view of the assemblage previously described, with the excess resin 16 from the interior of the stack of layers formed into a band about the stack and lying in the space formed by the hollowed-out wall 10. In order to strip off the upper glass disc 1', the screws 15 (FIG. 2) are removed from the upper ring 14. An O-ring 17 of rubber or soft resilient material is placed on the glass disc 1', just inside the rim of the ring 14. A circular plate 18 is placed over the centre of the ring 14, and is sufficiently large to extend over the O-ring 17 and the inner edge of the ring 14. The O-ring is, of course, sufficiently thick that it supports the plate 18 slightly clear of the upper surface of the ring 14. The plate 18 has a hollow connector 19 attached to it, communicating with the interior of the chamber 21 formed by the upper side of the glass disc 1', and the underside of the plate 18 within the interior of the O-ring 17. A connection 20 is made between the connector 19 and a vacuum pump (not shown). When vacuum is applied through the connector 19, atmospheric pressure causes the O-ring to be deformed as the plate 18 is forced downwards to meet the upper surface of the ring 14.

Bolts 22 are now screwed through threaded holes 23 in the ring 14 and bear against the upper surface of the mould ring 9. As the bolts 22 are progressively screwed inwards, the ring 14 is separated from the mould ring 9, and it will be clear that the low pressure in the chamber 21 causes the glass disc 1' to follow the upward movement of the ring 14 with the result that the disc 1' is stripped from the film layer 3', leaving the film layer firmly adhering to the backing resin layer 7'.

The ring 14, together with the disc 1', the O-ring 17 and the plate 18 are removed from the moulding 9. The vacuum in the chamber 21 is now released and the O-ring 17 and the plate 18 are dismantled from the ring 14. The remainder of the assemblage is then inverted and the glass disc 1 is stripped from the film layer 3 in the same way.

Finally the mould ring is separated into its two halves to release the composite member, which now consists of a central core disc 12 with the resin layers 7 and 7' bonded on either side of it with reinforcing layers 11 and 13 respectively. The two outer faces of the resin layers each carry a film 3, 3' of cobalt having a surface finish imparted by the glass discs 1 and 1'. Hence the high surface finish on the cobalt film layers is achieved without the necessity for a mechanical polishing process.

In order to enable the two halves of the mould ring to be maintained in correct relationship it is to understood that conventional means, such as an external band, or lugs with locating pins, may be used. In the latter case the lugs may also be provided with screwed holes into which bolts may be inserted to assist in separating the halves.

It will be realised that single- or double-sided recording members may be produced in the manner described. Furthermore, although the method of making plain discs has been described, it will be understood that mounting plates or holes may be provided during the moulding process by casting-in on the one hand, or by inserting a dummy core on the other, in the conventional manner. Thus, the risk of damage to the highly finished recording surfaces by subsequent machining operations is correspondingly avoided or reduced.

While the deposition of the cobalt film directly on to the original glass surface has been described, it is alternatively possible to form the cobalt film on to an intermediate layer, such as a layer of flexible synthetic plastic material to aid in subsequent stripping of the cobalt film.

Also, while a preferred method of stripping glass disc 1 from the film of magnetic material 3 has been disclosed, it will be realised that other stripping techniques may be employed. For example, it is possible to separate glass disc 1 by wedging a knife edge between disc 1 and film 3 and prying disc 1 from the film of magnetic material 3. The difficulty with such a technique however, is that the likelihood of disc 1 cracking is increased as a result of non-uniform stresses being developed therein. In fact, a clear advantage of the preferred stripping technique is that a vacuum pressure applies a uniform pressure (hence uniform stresses in disc 1) so that the likelihood of disc 1 cracking is substantially reduced or avoided.

I claim:

1. A method of making a record member having a magnetisable recording surface including the steps of depositing a film of magnetisable material on a highly finished surface of a first member; forming on the film of magnetisable material a layer in liquid form of material which sets to a substantially rigid state, causing the liquid layer to set to provide a substantially rigid backing layer bonded to the film of magnetisable material; and separating the first member and film of magnetisable material to expose a highly finished surface of the film of magnetisable material.

2. A method as claimed in claim 1, wherein the material forming the backing layer is a thermosetting resin which is subsequently cured to attain the substantially rigid condition.

3. A method as claimed in claim 1 and including the steps of placing the first member, having said magnetisable film deposited thereon, in a first holding means and securing the first member in a fixed position in the first holding means by a second holding means before applying the backing layer forming material in the liquid state.

4. A method as claimed in claim 1 in which the separating of the film of magnetisable material from the first member includes the steps of placing the first member having the magnetisable film and backing layer thereon in supporting means with the uncoated side of the first member exposed; engaging the peripheral regions of said exposed side by a movable retaining section which engages with the supporting means; constraining the backing layer against displacement relative to the supporting means; reducing the atmospheric pressure on the exposed side of the first member to lock the first member to the movable section and separating the movable section from the supporting means to separate the first member and the magnetisable film.

References Cited

UNITED STATES PATENTS

| | | | |
|---|---|---|---|
| 2,746,877 | 5/1956 | Matthes | 156—230 UX |
| 3,442,742 | 5/1969 | Jorgensen | 156—230 X |

CARL D. QUARFORTH, Primary Examiner

S. J. LECHERT, Assistant Examiner

U.S. Cl. X.R.

106—37; 156—151, 182, 247, 280, 285, 300; 161—42; 274—41.4